(12) United States Patent
Lesmerises

(10) Patent No.: US 7,149,659 B1
(45) Date of Patent: Dec. 12, 2006

(54) SYSTEM AND METHOD FOR PERFORMING RELIABILITY ANALYSIS

(75) Inventor: Alan L. Lesmerises, San Antonio, TX (US)

(73) Assignee: Standard Aero, Inc., San Antonio, TX (US)

( * ) Notice: Subject to any disclaimer, the term of this patent is extended or adjusted under 35 U.S.C. 154(b) by 0 days.

(21) Appl. No.: 11/196,200

(22) Filed: Aug. 3, 2005

(51) Int. Cl.
*G06F 11/30* (2006.01)
*G06F 15/00* (2006.01)

(52) U.S. Cl. .............. 702/185; 702/182; 702/183; 702/187

(58) Field of Classification Search ............. 702/181, 702/182, 183, 185, 187; 703/6, 7; 714/1–2, 714/25, 30, 37, 47
See application file for complete search history.

(56) References Cited

U.S. PATENT DOCUMENTS

| 5,822,218 | A | 10/1998 | Moosa et al. |
| 6,553,816 | B1 | 4/2003 | Palanisamy et al. |
| 6,571,202 | B1 | 5/2003 | Loman et al. |
| 6,684,349 | B1 | 1/2004 | Gullo et al. |
| 6,834,256 | B1 | 12/2004 | House et al. |
| 2002/0013643 | A1 | 1/2002 | Ishii et al. |
| 2002/0016699 | A1 | 2/2002 | Hoggart et al. |
| 2002/0078403 | A1 | 6/2002 | Gullo et al. |
| 2002/0174384 | A1* | 11/2002 | Graichen et al. ............. 714/37 |
| 2004/0044499 | A1 | 3/2004 | House et al. |

FOREIGN PATENT DOCUMENTS

WO   WO 00/17496   3/2003

OTHER PUBLICATIONS

"Life Data Analysis (Weibull Analysis)—An Overview of Basic Concepts and Directory of Other Resources," http://www.weibull.com/basics/lifedata.htm, 1992-2005, ReliaSoft Corporation, pp. 1-4.
"Analysis of Right Censored (Suspended) Data," http://www.weibull.com/LifeDataWeb/right_censored_suspended_data.htm, 1996-2004, ReliaSoft Corporation, pp. 1-5.
"ReliaSoft's Alternate Ranking Method (RRM) Step-by-Step Example," http://www.weibull.com/LifeDataWeb/reliasoft_a_alternate_ranking_rrm_step_by_step_example.htm, 1996-2004, ReliaSoft Corporation, pp. 1-6.
"Grouped Data Analysis," http://www.weibull.com/LifeDataWeb/grouped_data_analysis.htm, 1996-2004, ReliaSoft Corporation, pp. 1-2.

* cited by examiner

*Primary Examiner*—Bryan Bui
(74) *Attorney, Agent, or Firm*—Toler Schaffer, LLP

(57) ABSTRACT

The disclosure is directed to a method of performing reliability analysis for a population of units. The method includes generating suspension population data based on a suspension representation, accessing failure data associated with the population of units, and performing reliability analysis for the population of units based at least in part on the generated suspension population data and the failure data.

20 Claims, 2 Drawing Sheets

SYSTEM AND METHOD FOR PERFORMING RELIABILITY ANALYSIS

FIELD OF THE DISCLOSURE

This disclosure, in general, relates to systems and methods for performing reliability analysis.

BACKGROUND

Increasingly, industry is turning to statistical reliability analysis for equipment and products. Such statistical reliability analysis is useful in planning and budgeting for maintenance, predicting costs associated with product warranties, and making decisions about maintenance of a particular device. In addition, some manufacturers have turned to statistical reliability analysis to make decisions about upgrades to upcoming product releases.

Traditional statistical reliability analysis and, in particular, Weibull analysis relies on failure data for a population of devices. If a complete data set is available (i.e., failure ages are known for each device within the population), statistical reliability analysis, such as Weibull analysis, can provide predictions, such as mean-time-to-failure for a particular device, percentages of devices that will fail at a particular time or before a particular age, a statistical distribution of failure ages, and other statistical measures of device failures. The age of a particular device may be measured in operating times, such as time in service, or other cumulative performance measures, such as mileage or cycles or the number of revolutions.

However, a typical population includes devices that have yet to fail, termed "suspensions." In Weibull analysis, such populations are often denoted as "right censored populations." While analysis techniques for suspension populations have been developed, these analysis techniques typically rely on snapshots of population data including both the suspension data and failure data.

Often though, detailed information of the status of actual devices in service is incomplete or nonexistent. If the data does exist, it may be difficult to compile for use as suspension data, or it may change so often that taking a snapshot for each reliability analysis would be impractical. Furthermore, the data may exist in the form of 'x' units within a certain age range, 'y' units within another age range, etc. Other possible reasons that the data would be difficult to compile include large populations serviced in different locations, the maintenance records being in paper format, or the part information has to be extracted from long text narratives, etc. As such, an improved system and method would be desirable for analyzing the reliability of populations of devices.

SUMMARY

In a particular embodiment, the disclosure is directed to a method of performing reliability analysis for a population of units. The method includes generating suspension population data based on a suspension representation, accessing failure data associated with the population of units, and performing reliability analysis for the population of units based at least in part on the generated suspension population data and the failure data.

In a further exemplary embodiment, the disclosure is directed to a method of performing reliability analysis. The method includes accessing operation data associated with a population of units. The operation data includes non-failure operation data associated with units within the population. The method further includes generating a suspension representation based at least in part on the non-failure operation data and generating suspension population data based at least in part on the suspension representation and a total population size of the population of units.

In one exemplary embodiment, the disclosure is directed to a computer readable media including computer operable instructions operable by a processor to perform a method of performing reliability analysis. The method includes generating suspension population data based on a suspension representation, accessing failure data associated with a population of units, and performing reliability analysis for the population of units based at least in part on the generated suspension population data and the failure data.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED DRAWING(S)

In a particular embodiment, the disclosure is directed to a method for performing reliability analysis of a population of devices. The method includes accessing non-failure operation data associated with a population of devices, generating a suspension representation based at least in part on the non-failure operation data associated with the population of devices, and generating a suspension population based on the suspension representation equal to the total number of units in operation for the population of devices. The method may also include performing reliability analysis based at least in part on the generated suspension population. The generated suspension population forms at least part of estimated suspension population data. In addition, the method may include accessing failure data for the population of devices and performing the reliability analysis based on the failure data. In one exemplary embodiment, the method may be, in whole or in part, implemented in computer software and stored on computer readable media.

In practice, the reliability analysis may be performed on individual components, such as gearboxes, compressors or turbines, or on multi-component systems, such as engines or electronic devices. In addition, the reliability analysis may be performed on a complex system that includes multiple components. Alternatively, reliability analysis may be extended to populations in which members of the population experience distinct events. For example, the analysis may be extended to living systems in which members within a population experience illness and death.

In general, embodiments of the method can use a representation derived from a population of devices at a particular point in time. In particular, "suspensions" or devices still in operation that have not been removed from the population by failure are cataloged to provide suspension data. The suspension data is generally measured or monitored and includes an age or other cumulative measure of each device. The age of a device may, for example, be measured in hours of operation, calendar age of the device, or another measure of wear and tear on the device. In one example, age is measured in hours of operation. In another example, age may be measured in total days in service. Alternatively, age may be measured in distance traveled, number of cycles, total number of revolutions in the case of rotating parts, or number of actuations for a switch or solenoid or hydraulic cylinder.

Figure 1:
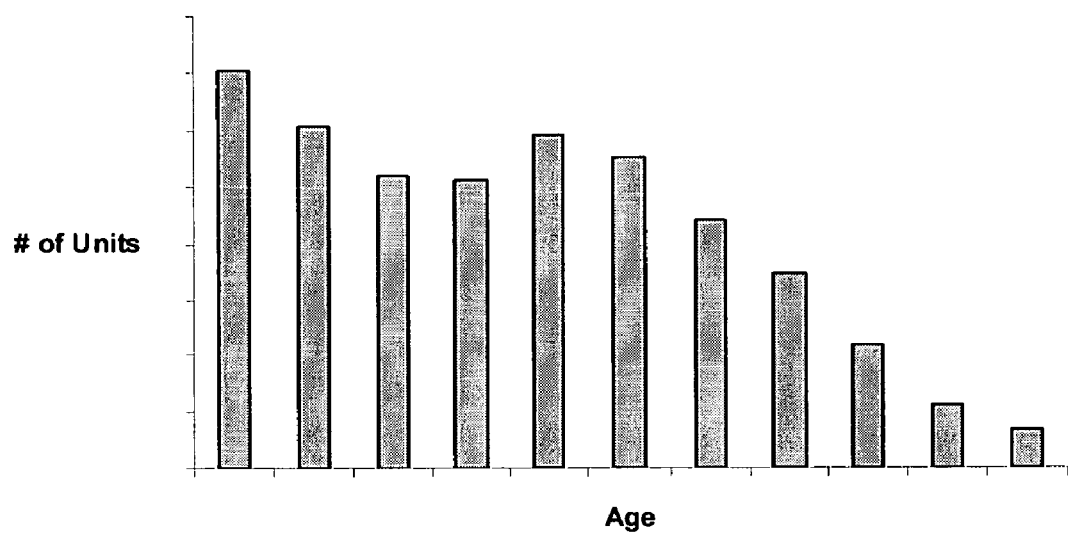
FIG. 1 includes an illustration of an exemplary population of units in service.

The suspension data may be represented as a table or in graphical form. FIG. 1 includes an illustration of an exemplary graphical representation of a number of components whose ages fall within particular age ranges or "bins." For example, each 'bar' in the illustration may represent the number of units within a certain range of operating times, such as 'x' units between 0 and 500 hours, 'y' units between 500 and 1000 hours, 'z' units between 1000 and 1500 hours, etc. Alternatively, the suspension data may be represented in a cumulative distribution in which individual components within the population are ordered based on age.

Figure 2:
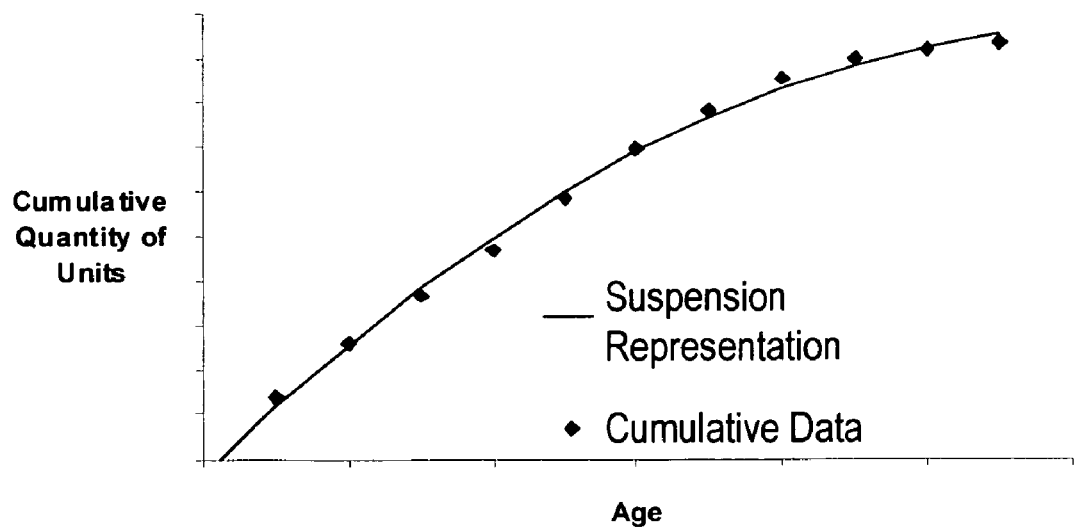
FIG. 2 includes an illustration of an exemplary cumulative representation of the population.

In one exemplary embodiment, the suspension data is used to generate or develop a suspension representation. In one particular embodiment, parameters are fit to a cumulative data representation of the units in service. FIG. 2 includes an illustration of a suspension representation in which the parameters have been adjusted to fit to a cumulative data representation of the units in service. In one example, the number of components falling within a range of age or "bin" is identified. To form the cumulative representation, the number of components within a particular bin is added to the sum of components falling in bins having an age less than the age represented by the particular bin. Continuing the example provided in relation to FIG. 1 above, the first data point would be 'x' units with less than 500 hours, the second data point may be 'x'+'y' units with less than 1000 hours, the third data point would be 'x'+'y'+'z' units with less than 1500 hours, etc. In another exemplary embodiment, each device is placed in an ordered list based on age. As illustrated in FIG. 2, the cumulative representation includes a plot in which age represents the abscissa and the component number is plotted as the ordinate. The illustrated plot includes a cumulative number of units in service (shown as individual data points on the chart) and a suspension representation of the cumulative data (shown as a solid line).

The cumulative representation of the suspension data may be fit using representations, such as polynomial functions, Weibull functions, lognormal functions, and combinations thereof. In general, a piece-wise continuous function that closely represents the cumulative suspension data may be used to construct the suspension representation. In one exemplary embodiment, the cumulative distribution is represented using a polynomial function, such as a first order polynomial (i.e., a straight line), a second order polynomial, or a higher order polynomial. In another exemplary embodiment, the representation uses a Weibull function.

To perform the analysis, the suspension population is generated. This data is generated by inverting the suspension representation. For example, estimated operating times for individual components are computed from this inverse representation to form an estimated suspension population. In one exemplary embodiment, the suspension representation is inverted and estimated individual components are generated to form an estimated suspension population. For example, a second order polynomial function may be inverted using the quadratic equation to generate the age of a particular component based on its component number (i.e., $1^{st}$, $2^{nd}$, $3^{rd}$, ... $n^{th}$ component) within a component population.

For polynomial suspension representations, the function may exhibit multiple roots, one or more of which may produce invalid results. Therefore, to represent the ages of the units in the suspension population, only one of those roots may be used and analysis may be performed to determine which of those roots produces estimated suspension values that correspond to actual units in service. For an exemplary second order polynomial function, the function has two roots, one of which may be negative. To avoid negative ages of individual components within the estimated suspension population (which would not be valid), the root that results in positive values is used to generate the suspension population data. For example, for a second order polynomial suspension representation of the form:

$$y_i = F(x_i) = ax_i^2 + bx_i + c$$

where $y_i$ is the component number in an ordered list of components, $x_i$ is the age, and a, b, and c are parameters, the inversion would take the following form:

$$x_i = F^{-1}(y_i) = \frac{-b \pm \sqrt{b^2 - 4a(c - y_i)}}{2a}$$

The '±' symbol indicates there are two possible values for this representation, corresponding to the two roots of the second-order polynomial $F(x_i)$ shown above.

In an alternative embodiment, a Weibull function is used to represent the cumulative distribution of the suspension population. As above, the Weibull function suspension representation of the form:

$$y_i = F(x_i) = \alpha \left[ 1 - e^{-\left(\frac{x_i - t_0}{\eta}\right)^\beta} \right]$$

where $y_i$ is the component number in an ordered list of components, $x_i$ is the age, and $t_0$, $\alpha$, $\beta$, and $\eta$ are parameters, may be inverted to form the inverted suspension representation:

$$x_i = F^{-1}(y_i) = \eta \left( -\ln\left(1 - \frac{y_i}{\alpha}\right)^{1/\beta} + t_0 \right)$$

In particular examples, the non-failure data used to generate the suspension representation or the failure data to be used in the reliability may be measured coarsely. To more closely represent the non-failure data or be more compatible with existing failure data, estimated suspension data acquired from the inverted suspension representation may be rounded to the nearest significant digit. In addition, a maximum function may be useful to select positive values for generated data or to produce cumulative data that does not have a negative slope. As such, a resulting inverted suspension representation may take the form:

$$x_i = \text{MAX}\lfloor \text{ROUND}\lfloor F^{-1}(y_i), 0.1 \rfloor, (x_i + 0.1) \rfloor$$

Using the inverted suspension representation, the estimated population of suspensions is generated and used in reliability analysis in conjunction with failure data. The failure data may include ages or other cumulative measures of individual units that are known to have failed.

The failure data and the estimated suspension population data are used to perform reliability analysis, such as Weibull analysis. For example, analysis techniques of right censored or suspended data may be used to perform analysis of the failure data and the estimated suspension population. Exemplary techniques include probability plotting and rank regression analysis techniques. In another example, a maximum likelihood analysis may be performed on populations with suspended members.

Using the reliability analysis, indicative results of reliability may be calculated. For example, reliability at a given time, such as the probability that a product will operate successfully beyond a particular point in time, may be calculated. In another example, the probability that a product will fail by a particular point in time may be determined. In addition, the average time of operation for a particular product or the mean time to failure may be determined. In other examples, the number of failures per unit time, the warranty time or estimated time when the product's reliability equals or falls below a particular value, the estimated time when the probability of failure will reach a particular value or various plots of probability and reliability may be determined. These results may be provided or displayed to a user. Alternatively, these results may be used as input for further analysis, such as cost analysis.

Figure 3:
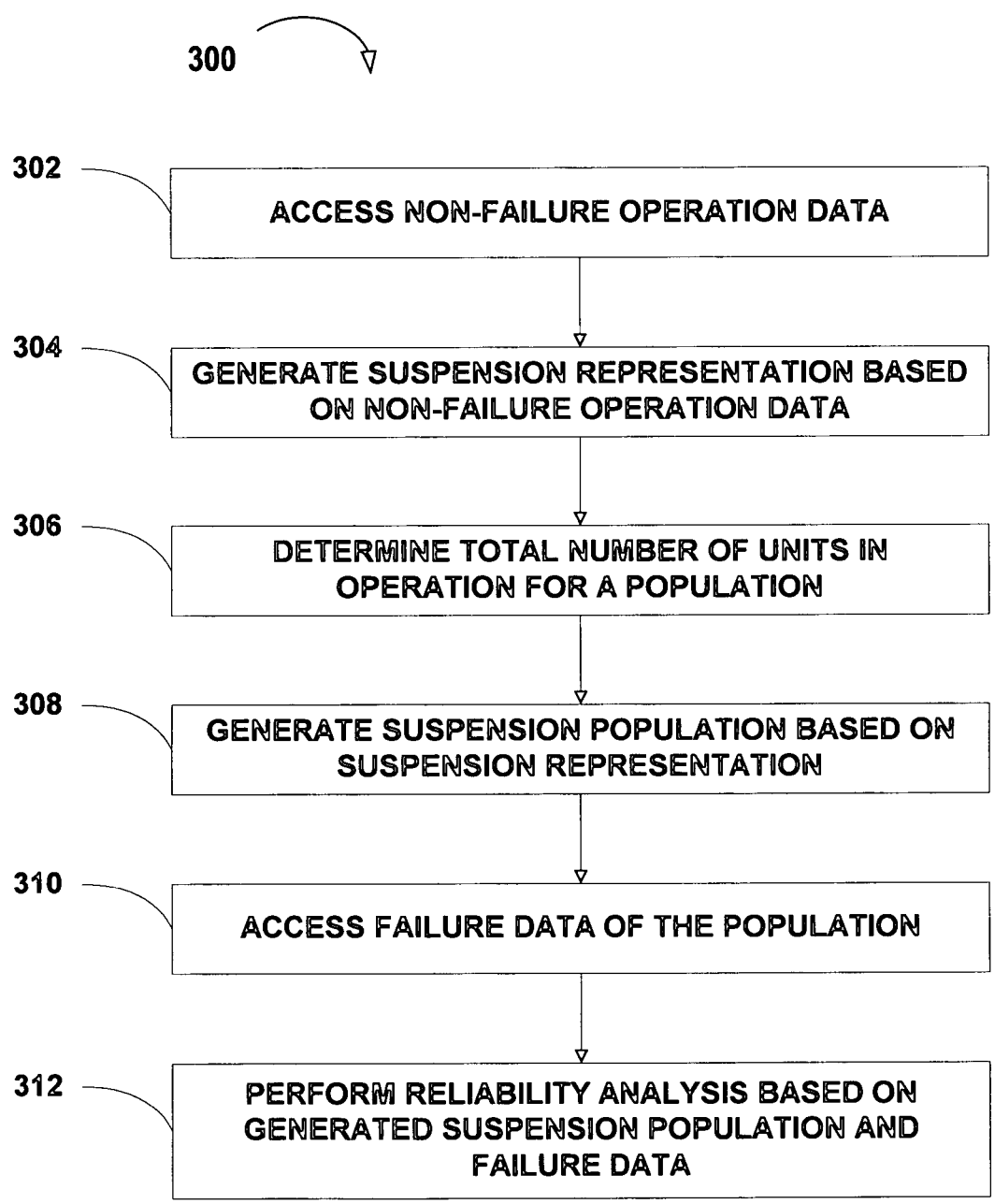
FIG. 3 includes an illustration of an exemplary method for performing reliability analysis for a population of devices, such as the population represented in FIGS. 1 and 2.

FIG. 3 includes an illustration of an exemplary method for performing reliability analysis on a population. The method 300 includes accessing non-failure operation data, as illustrated at 302. Typically, age or operating times are measured and recorded for each member of the population. The non-failure or suspension data may be recorded in a database and accessed to perform the analysis. Based on the suspension data, a suspension representation may be generated, as illustrated at 304. In one exemplary embodiment, a polynomial or Weibull function is fitted to a cumulative representation of suspension data.

The total number of units in a population to be represented is determined, as illustrated at 306. Using the total number of units in operation, an estimated suspension population having a population size equal to the total number of units in operation is generated based on the suspension representation, as illustrated at 308. For example, the suspension representation may be inverted and data for individual components within the estimated population generated. The generated estimated suspension population has a total number equal to the total number of units in operation. The generated data for individual components within the estimated suspension population form the suspension population data.

Failure data of related components may be accessed, as illustrated at 310, and the reliability analysis performed based at least in part on the estimated suspension population and the failure data, as illustrated at 312. For example, failure data may be measured and stored in a database. The database may be accessed to retrieve the failure data. Typically, the estimated suspension data and failure data are in the form of individual ages for individual components. However, reliability analysis may be performed on data that is discretized in which individual components are placed in bins representing the range or period of time in which they failed. Reliability analysis may be performed using methods for analyzing right censored data.

Once the reliability analysis has been performed, results of the analysis may be displayed to a user. In an alternative embodiment, the results of the reliability analysis may be used as input to decision making routines, such as routines for improving maintenance decisions or enhancing cost efficiency of maintenance operations. For successive analyses, the method may be performed starting at 306, 308 or 310. For example, once a suspension representation is determined, an estimated suspension population may be generated at a later time. Such an approach is particularly useful for stable populations. In a particular embodiment, the above methods are implemented in computer software that is operable by computational devices, such as computers and portable digital assistants. The computer software may be configurable to access databases and data stored at remote locations. In one embodiment, the computer software is stored on a computer readable medium such as magnetic, optical or solid state devices. Particular examples of computer readable media include optical media, such as CDs, and DVDs, magnetic media, such as hard drives and floppy disks, and solid-state memory, such as flash memory. In an alternative embodiment, the computer implemented instructions for performing the exemplary methods above is accessed via networks.

For multi-component systems, reliability analysis may be performed for each component within the system. Using the results of the reliability analysis, reliability statistics for the multi-component system as a whole may be determined. For example, reliability analysis using the methods described herein may be performed for a first component of a multi-component system and reliability analysis using the methods described herein may be performed for a second component of the multi-component system. From the analysis performed for each component, a mean-time-to-servicing or failure may be determined for the system as a whole. For example, an analysis of the mean-time-to-failure of an aircraft engine's constituent components may indicate that replacement of some components may be preferred, even if the component has not yet failed. Such analysis of the multi-component system and its constituent parts may be useful in estimating cost associated with future failures or in predicting cost associated with failures that may be discovered during overhaul of the system.

Methods may advantageously permit reliability analysis of right censored or suspended data without costly collection and accessing of suspension data. For example, in an automotive setting, an estimated suspension population may be used in place of collecting mileage data from each of the previous sold automobiles. In another exemplary embodiment, an estimated suspension model may be used in place of collecting time on wing for a large number of components in aircraft engines. The resulting analysis of the right censored data may be useful in performing maintenance, estimating costs associated with maintenance of mechanical systems, selectively determining whether an individual component should be replaced prior to failure, estimating the cost of an associated product warranty and developing warranty policies.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of performing reliability analysis for a population of units, the method comprising:
   determining a number of units in operation;
   generating suspension population data based on a suspension representation, wherein generating the suspension population data includes generating a simulated suspension population that has a population size equal to the number of units in operation;
   accessing failure data associated with the population of units;
   performing reliability analysis for the population of units based at least in part on the generated suspension population data and the failure data; and
   providing a result of the reliability analysis to a user.

2. The method of claim 1, further comprising:
   accessing non-failure operation data associated with the population of units; and
   generating the suspension representation based at least in part on the non-failure operation data associated with the population of units.

3. The method of claim 1, wherein units within the population of units are mechanical systems.

4. The method of claim 1, wherein the mechanical systems are associated with a component of an aircraft engine.

5. The method of claim 1, further comprising:
   determining a mean-time-to-failure for a particular unit within the population of units.

6. The method of claim 1, wherein the suspension representation includes a polynomial representation of cumulative suspension population data.

7. The method of claim 1, wherein the suspension representation includes a Weibull representation of cumulative suspension population data.

8. A method of performing reliability analysis for a population of units, the method comprising:
   generating suspension population data based on a suspension representation, wherein generating the suspension population data includes determining an age for a particular unit within a generated suspension population of units based on an inversion of the suspension representation and the particular unit's order within the suspension population;
   accessing failure data associated with the population of units;
   perform reliability analysis for the population of units based at least in part on the generated suspension population data and the failure data; and
   providing a result of the reliability analysis to a user.

9. The method of claim 8, further comprising:
   determining a mean-time-to-failure for a particular unit within the population of units.

10. The method of claim 8, wherein the suspension representation includes a polynomial representation of cumulative suspension population data.

11. The method of claim 8, the suspension includes a Weibull representation of cumulative suspension population data.

12. The method of claim 8, wherein the suspension representation includes a lognormal representation.

13. The method of claim 8, wherein the suspension representation includes any piece-wise continuous representation.

14. A method of performing reliability analysis, the method comprising:
   accessing operation data associated with a population of units, the operation data including non-failure option data associated with units within the population;
   generating a suspension representation based at least in part on the non-failure operation data;
   generating suspension population data based at least in part on the suspension representation and a total population size of the population of units, wherein generating the suspension population data includes generating operation age data for a unit of a suspension population based at least in part on the units order within the suspension population;
   perform reliability analysis for the population of units based at least in part on the generated suspension population data; and
   providing a result of the reliability analysis to a user.

15. The method of claim 14, wherein the suspension population data comprises an estimated population of units.

16. The method of claim 14, further comprising:
   accessing failure data associated with the population of units; and
   performing reliability analysis for the population of units based at least in part on the failure data and the generated suspension population data.

17. The method of claim 16, further comprising determining a mean-time-to-failure of a particular unit within the population of units based at least in part on the reliability analysis.

18. A computer readable media including computer operable instructions operable by a processor to perform a method of performing reliability analysis, the method comprising:
   determining a number of units in operation;
   generating the on population data based on a suspension representation, wherein generating the suspension population data includes generating a simulated suspension population that has a population size equal to the number of units in operation;
   accessing failure data associated with a population of units;
   performing reliability analysis for the population of units based at least in part on the generated suspension population data and the failure data; and
   providing a result of the reliability analysis to a user.

19. The computer readable media of claim 18, wherein the method further comprises:
   accessing non-failure operation data associated with the population of units; and
   generating the suspension representation based at least in part on the non-failure operation data associated with the population of units.

20. The computer readable media of claim 18, wherein the method further comprises:
   determining a mean-time-to-failure for a particular unit within the population of units.

* * * * *